(12) United States Patent
Murakami

(10) Patent No.: US 6,723,023 B2
(45) Date of Patent: Apr. 20, 2004

(54) VEHICLE AUXILIARY BRAKING SYSTEM

(75) Inventor: Isao Murakami, Hashimoto (JP)

(73) Assignee: Exedy Corporation, Osaka (JP)

( * ) Notice: Subject to any disclaimer, the term of this patent is extended or adjusted under 35 U.S.C. 154(b) by 6 days.

(21) Appl. No.: 10/061,301

(22) Filed: Feb. 4, 2002

(65) Prior Publication Data

US 2002/0107111 A1 Aug. 8, 2002

(30) Foreign Application Priority Data

Feb. 7, 2001 (JP) .................................... 2001-031236

(51) Int. Cl.⁷ ............................ F02D 9/06; B60K 41/24
(52) U.S. Cl. ................ 477/210; 192/215; 192/12 R; 477/71; 477/92
(58) Field of Search .................... 477/210, 218, 477/71, 74, 94, 95, 904, 92; 180/211, 215; 192/14, 116, 12 C, 215, 225

(56) References Cited

U.S. PATENT DOCUMENTS

| | | | | |
|---|---|---|---|---|
| 4,618,040 A | * | 10/1986 | Honma et al. | 477/71 |
| 4,821,854 A | * | 4/1989 | Koshizawa | 477/74 |
| 5,607,209 A | * | 3/1997 | Narita et al. | 303/122.11 |
| 6,202,780 B1 | * | 3/2001 | Tanaka et al. | 180/179 |
| 6,249,735 B1 | * | 6/2001 | Yamada et al. | 701/65 |
| 6,287,236 B1 | * | 9/2001 | Ishikawa | 477/71 |

FOREIGN PATENT DOCUMENTS

| | | | |
|---|---|---|---|
| JP | 5-215190 A | 8/1993 | |
| JP | 5-285745 A | 11/1993 | |
| JP | 6-17714 B | 3/1994 | |
| JP | 06247190 A | * 9/1994 | ........... B60K/41/28 |
| JP | 7-15472 U | 3/1995 | |
| JP | 8-226509 A | 9/1996 | |

\* cited by examiner

*Primary Examiner*—Tisha D Lewis
(74) *Attorney, Agent, or Firm*—Shinjyu Global IP Counselors, LLP

(57) ABSTRACT

A vehicle auxiliary braking system is provided to accomplish a braking effect similar to engine braking inexpensively, to extend the life of the brakes, and to reduce the work cycle time in order to improve work efficiency. The system has a centrifugal sensor 20, an accelerator sensor 21, and a braking clutch engaging means that includes a braking hydraulic circuit 22. The centrifugal sensor 20 detects that the vehicle is traveling when the vehicle is moving at or above a prescribed speed. Accelerator sensor 21 detects when the depression amount of the accelerator pedal 6 is at or below a prescribed amount. The braking clutch engaging means engages the clutch that corresponds to the opposite travel direction when the vehicle is traveling at or above the prescribed speed and the accelerator depression amount is at or below the prescribed depression amount.

19 Claims, 4 Drawing Sheets

VEHICLE AUXILIARY BRAKING SYSTEM

BACKGROUND OF THE INVENTION

1. Field of the Invention

The present invention relates to an auxiliary braking system. More specifically, the present invention relates to an auxiliary braking system for a vehicle equipped with a transmission having a forward clutch and a reverse clutch.

2. Background Information

Industrial-use vehicles, such as forklifts, are usually equipped with a torque converter to which torque is transmitted from an engine side and a transmission to which torque is transmitted from the torque converter. The transmission has a forward clutch and a reverse clutch and outputs torque to the output shaft by engaging one or the other of these clutches. When the brakes are applied in such a forklift, a foot brake is depressed causing a drum brake to operate and braking the travel of the vehicle.

In general, braking frequency is higher for forklifts and other industrial-use vehicles than for ordinary vehicles. Furthermore, since the drum brakes of forklifts only operate on the front wheels, a large burden is placed on the drum brakes. Consequently, the wear of the lining of the drum brakes is severe and the service life of the brakes is shortened.

Moreover, since many industrial-use vehicles use a torque converter, the frequency of foot brake use is higher because engine braking is not very effective even when the driver releases his or her foot from the accelerator pedal to disengage engine throttle. In particular, when a divided stator torque converter is used, the gear ratio (speed ratio) is small compared to torque converters that do not have a divided stator and engine braking is even less effective.

As discussed, since it is difficult to utilize engine braking in conventional forklifts and other industrial-use vehicles, the life of the foot brake is short and it is difficult to reduce the work cycle time, making work efficiency poor.

In view of these issues, a hydrostatic transmission (HST) that uses a hydraulic pump and a hydraulic motor has already been proposed. When an HST is used, it is possible to achieve a braking effect similar to that of engine braking by controlling the hydraulic pressure that acts on the hydraulic motor. However, a conventional HST system is expensive and its efficiency is relatively low. Thus, there are still issues remaining to be solved regarding the use of this method in actual practice.

In view of the above, there exists a need for a vehicle auxiliary braking system that overcomes the above-mentioned problems in the prior art. This invention addresses this need in the prior art as well as other needs, which will become apparent to those skilled in the art from this disclosure.

SUMMARY OF THE INVENTION

An object of the present invention is to provide inexpensively a braking effect similar to engine braking for industrial use vehicles. Another object of the present invention is to extend the life of the brakes by reducing the load that acts on the brakes. Another object of the present invention is to reduce the work cycle time in order to improve work efficiency.

A vehicle auxiliary braking system for use in a vehicle equipped with a transmission having a forward clutch and a reverse clutch in accordance with a first aspect of the present invention has a travel detection means, an accelerator depression detection means, and a braking clutch engaging means. The travel detection means detects whether the vehicle is traveling at or above a prescribed speed. The accelerator depression detection means detects whether the depression amount of the vehicle accelerator is at or below a prescribed depression amount. The braking clutch engaging means engages the clutch that corresponds to the opposite travel direction when the detection results from the travel detection means and accelerator depression detection means indicate that the vehicle is traveling at or above the prescribed speed and the accelerator depression amount is at or below the prescribed depression amount.

With this system, when the accelerator depression amount goes below the prescribed depression amount while the vehicle is traveling, the braking clutch engaging means engages the clutch corresponding to the opposite travel direction based on the detection results from the travel detection means and the accelerator depression detection means. Consequently, a braking effect similar to engine braking can be expected. As a result, the load on the main brake is reduced and the life of the main brake is lengthened. Since travel resulting from momentum is suppressed, the work cycle time can be shortened and the work efficiency improves. Low cost can also be achieved because the system can be accomplished without adding brake linings or other additional members to the brakes.

A vehicle auxiliary braking system in accordance with a second aspect of the present invention is the system of the first aspect, wherein the forward clutch and reverse clutch are both hydraulic clutches. Further, the braking clutch engaging means selectively supplies a prescribed braking hydraulic pressure to the forward clutch and reverse clutch.

In this system, the clutches are hydraulic. Thus, the braking force can be controlled easily by controlling the hydraulic pressure. Additionally, heating that occurs when the brakes are applied can be suppressed easily by securing a sufficient amount of lubricating oil.

A vehicle auxiliary braking system in accordance with a third aspect of the present invention is the system of the second aspect, wherein the accelerator depression detection means detects whether or not the accelerator pedal is being depressed.

With this system, engine braking occurs whenever the driver releases his or her foot from the accelerator pedal. Consequently work efficiency is improved even further.

A vehicle auxiliary braking system in accordance with a fourth aspect of the present invention is the system of the second or third aspect, wherein the travel detection means has a centrifugal element and a travel detection hydraulic circuit. The centrifugal element is acted upon by a centrifugal force when the output shaft of the vehicle rotates. The travel detection hydraulic circuit drains the hydraulic oil that is being directed to the forward clutch and the reverse clutch of the braking clutch engaging means by the centrifugal element moving outward due to centrifugal force.

Since this system utilizes a mechanical means to detect whether or not the vehicle is traveling, it is possible to construct the system inexpensively relative to those systems that detect and control using a microcomputer or the like.

A vehicle auxiliary braking system in accordance with a fifth aspect of the present invention is the system of any of the second to fourth aspects, wherein the braking clutch engaging means also has a regulator valve for adjusting the braking hydraulic pressure supplied to the forward clutch and the reverse clutch.

Since this system adjusts the braking hydraulic pressure using a regulator valve, the braking force can be adjusted easily and the most efficient braking force can be obtained for a variety of vehicle specifications.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
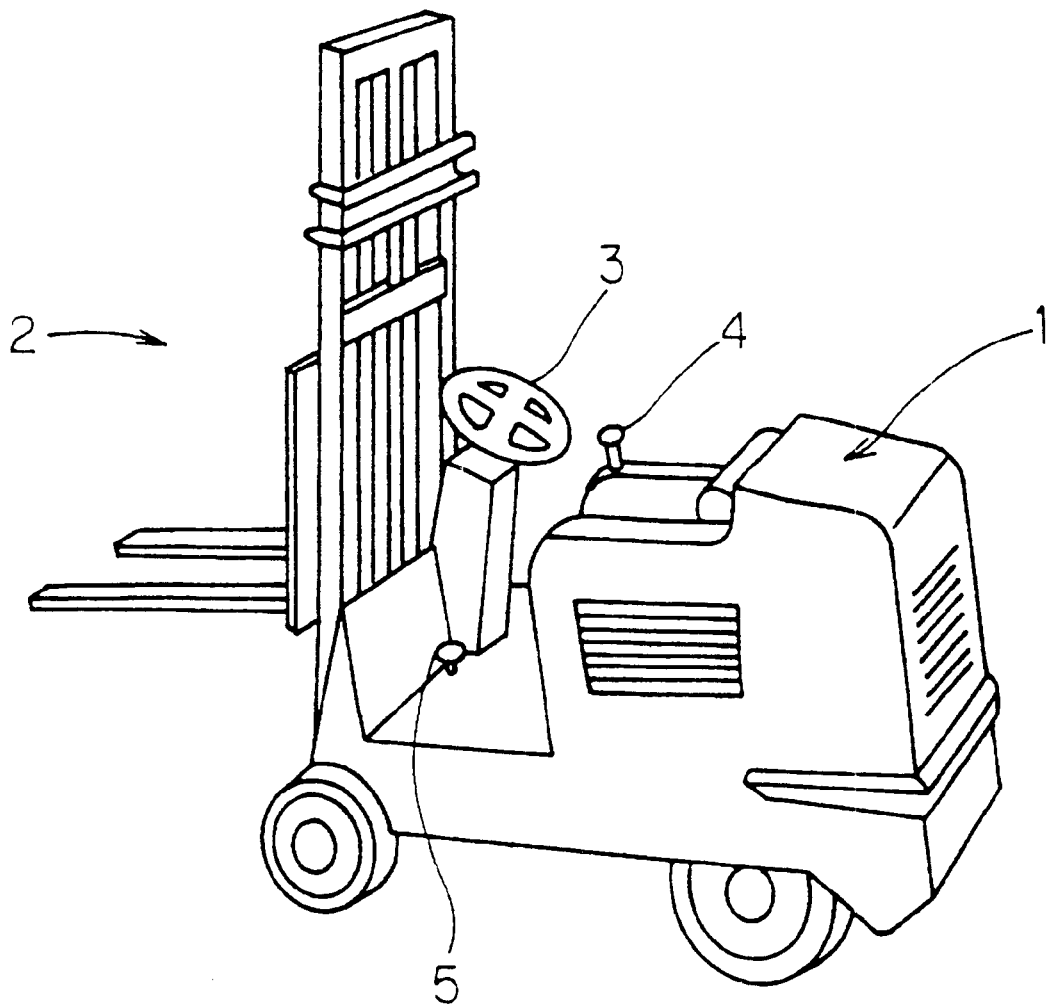
FIG. 1 is a perspective view of a forklift using an auxiliary braking system in accordance with a preferred embodiment of the present invention.

The forklift shown in FIG. 1 chiefly has a main body 1 and a fork unit 2 provided on the front face of the main body 1. Various apparatuses are provided for making the forklift travel and for operating the fork unit 2. The main body 1 is provided with a steering wheel 3 for steering, a shift lever 4 for switching between forward and reverse travel of the forklift and for operation of the fork unit 2, a brake pedal 5, and an accelerator pedal 6 (see FIG. 2).

Figure 2:
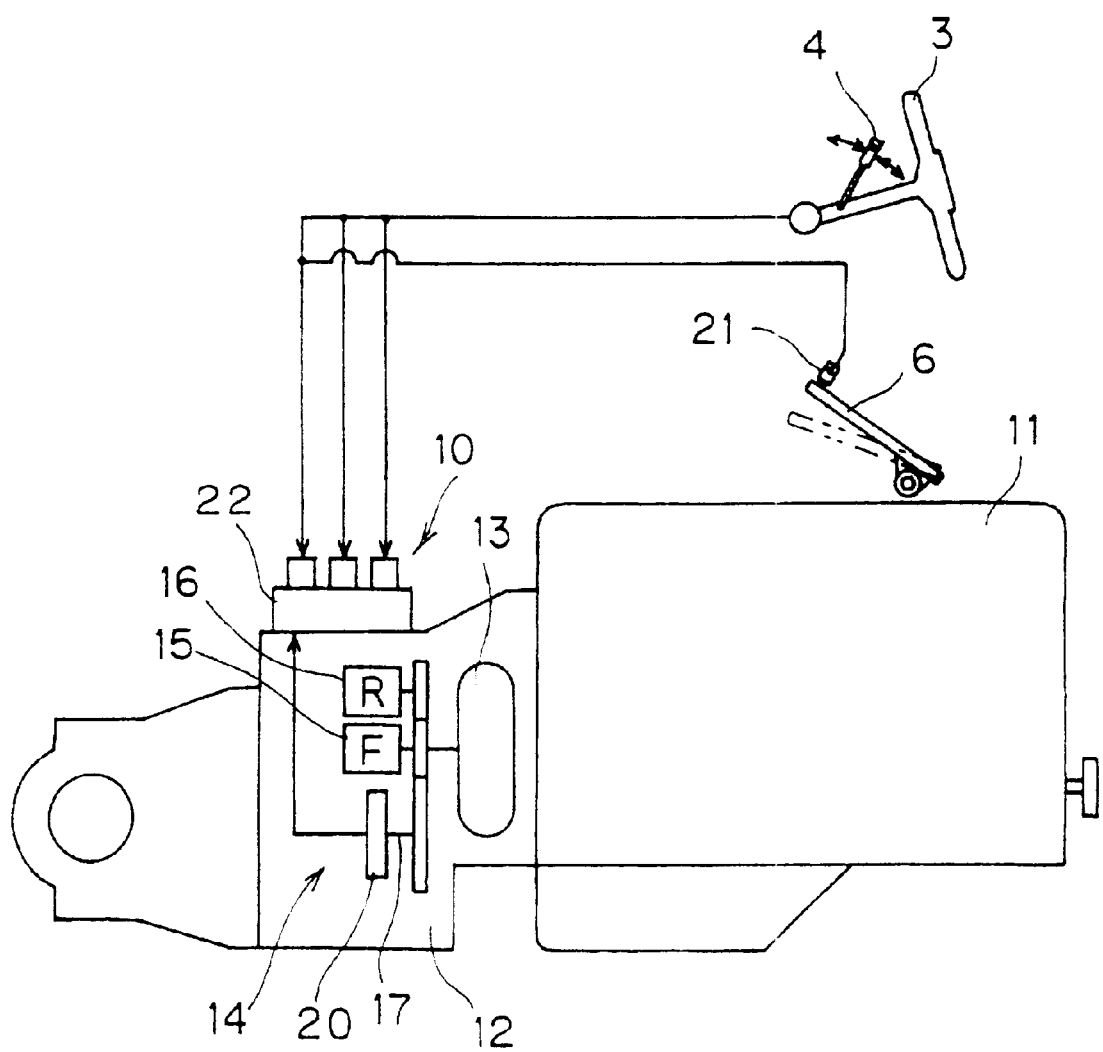
FIG. 2 is a schematic view of the auxiliary braking system.

FIG. 2 shows a simple block diagram of an auxiliary braking system 10 provided inside the main body 1. An engine 11 and a power transmission device 12 mounted to the engine 11 are provided inside the main body 1. The power transmission device 12 has a torque converter 13 disposed on the engine 11 side and a power shift transmission 14. The power shift transmission 14 has a forward hydraulic clutch 15 and a reverse hydraulic clutch 16.

Constitution of the Auxiliary Braking System

The auxiliary braking system 10 includes a centrifugal sensor 20, an accelerator sensor 21, and a braking hydraulic circuit 22. The centrifugal sensor 20 is provided on the output shaft 17 of the transmission 14 and serves to detect the traveling condition of the vehicle. The accelerator sensor 21 detects whether or not the accelerator pedal 6 is on or off (i.e., being depressed or not). The braking hydraulic circuit 22 operates the braking clutch based on the detection results from the sensors 20, 21.

Figure 3:
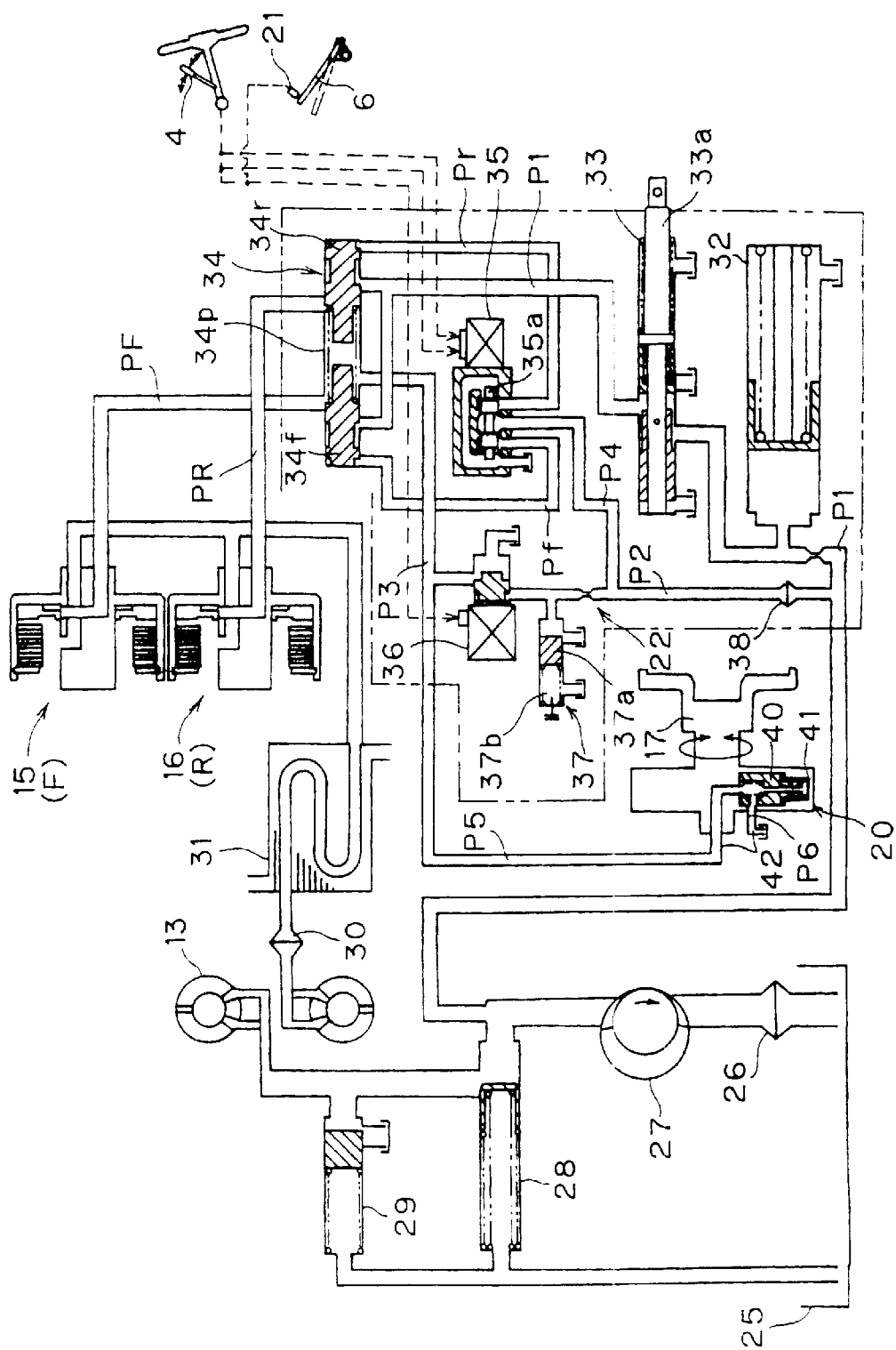
FIG. 3 is a view of a hydraulic circuit diagram for the auxiliary braking system.

FIG. 3 shows a circuit diagram including the sensors 20, 21 and the braking hydraulic circuit 22. First, the main circuit that supplies operating hydraulic pressure to the hydraulic clutches 15, 16 is explained. The main circuit includes an oil pump 27, a main regulator valve 28, a torque converter inlet pressure release valve 29, and the torque converter 13. The oil pump 27 pulls hydraulic oil from an oil tank 25 through an oil strainer 26. The main regulator valve 28 is provided on an outlet side of the oil pump 27. The torque converter inlet pressure release valve 29 is provided between the main regulator valve 28 and the torque converter 13. Hydraulic oil from the torque converter 13 is fed through an oil filter 30 and an oil cooler 31 as lubricating oil to the clutches 15, 16.

An accumulator 32 is provided between the oil pump 27 and the hydraulic clutches 15, 16. The accumulator 32 receives hydraulic oil from the oil pump 27 through an oil path P1, an inching valve 33, and a forward-reverse switching valve 34. The forward-reverse switching valve 34 has a forward spool 34f and a reverse spool 34r. The forward-reverse switching valve 34 is controlled by means of a travel solenoid valve 35. The travel solenoid valve 35 is controlled by operating the shift lever 4. A spring 34p is provided between the opposing faces of the forward spool 34f and the reverse spool 34r. The spring 34p applies a force on the spools 34f, 34r in a direction to move the spools apart from each other. An outlet of the forward-reverse switching valve 34 is connected to the forward hydraulic clutch 15 via a forward oil path PF and to the reverse hydraulic clutch 16 via a reverse oil path PR. There is a switching spool 35a inside the travel solenoid valve 35. An oil path P4 (discussed later) is connected to a forward pilot oil path Pf or a reverse pilot oil path Pr by the movement of the spool 35a.

Meanwhile, the braking hydraulic circuit 22 is provided in parallel with the aforementioned main circuit and includes a braking solenoid valve 36 and a braking regulator valve 37. Hydraulic pressure (hydraulic oil) for braking is supplied from the oil pump 27 through an oil path P2 to the braking solenoid valve 36. The braking regulator valve 37 is provided in the oil path P2 and used for adjusting the braking-use hydraulic pressure, i.e., the braking force. The braking solenoid valve 36 is controlled by the on-off status of the accelerator pedal 6. The braking solenoid valve 36 controls whether or not braking-use hydraulic pressure is supplied to the forward-reverse switching valve 34 through an oil path P3. The oil path P3 directs braking hydraulic oil between the forward-use spool 34f and the reverse-use spool 34r of the forward-reverse switching valve 34. Additionally, the braking regulator valve 37 has a spool 37a and a spring 37b that applies a force on the spool 37a in one direction. The braking regulator valve 37 is capable of adjusting the regulator pressure, i.e., the braking hydraulic pressure, by changing the set length of the spring 37b using an external means. A filter 38 is provided upstream of the braking solenoid valve 36. The oil path P2 branches apart from the oil path P4 upstream of the braking regulator valve 37. The oil path P4 connects with the travel solenoid valve 35.

The centrifugal sensor 20 has a centrifugal element 40, a spring 41, and a travel detection hydraulic circuit 42. The centrifugal element 40 moves outward due to centrifugal force. The spring 41 constantly applies a force pushing the centrifugal element 40 inward. The travel detection hydraulic circuit 42 drains the braking-use hydraulic pressure when the output shaft stops rotating and the centrifugal oil element 40 is moved inward by the spring 41. The travel detection hydraulic circuit 42 has a path P5 and path P6. The flow path P5 directs hydraulic oil from the downstream side of the braking solenoid valve 36 into the chamber where the centrifugal element 40 is housed. The oil path P6 drains the oil path P5.

The accumulator 32, the inching valve 33, the forward-reverse switching valve 34, the travel solenoid valve 35, the braking regulator valve 36, and the braking solenoid valve 37 constitute one control valve assembly.

Operation

Normal Travel

The operation during normal forward or reverse travel is explained.

When the engine of the vehicle is running, the oil pump 27 is driven and hydraulic oil is supplied to the torque converter 13 and also to the accumulator 32, the inching valve 33, and the forward-reverse switching valve 34 through the oil path P1. Hydraulic oil is also supplied to the braking hydraulic circuit 22 through the oil path P2.

When the shift lever 4 is shifted to forward or reverse mode while the engine is in this state, the travel solenoid valve 35 is driven by an electric signal issued in response to the shift operation. When the travel solenoid valve 35 is driven to the forward side or the reverse side, the spool 35a inside the valve moves and the oil path P4 is connected either to the forward pilot oil path Pf or the reverse pilot oil path Pr. FIG. 3 illustrates the neutral mode.

If the shift lever 4 is shifted to the forward mode position, the spool 35a of the travel solenoid valve 35 moves to the left as shown in FIG. 3 and the oil path P4 is connected to the forward pilot oil path Pf. As a result, hydraulic pressure is supplied to an end part (left end in FIG. 3) of the forward spool 34f in the forward-reverse switching valve 34 and the forward spool 34f moves to the right in opposition to the force applied by the spring 34p. Then, the oil path P1 and the forward pilot oil path PF, which are disconnected from each other in neutral mode, are connected and hydraulic oil is supplied to the forward hydraulic clutch 15.

Conversely, if the shift lever 4 is shifted to the reverse mode position, the spool 35a of the travel solenoid valve 35 moves to the right as shown in FIG. 3 and the oil path P4 is connected to the reverse pilot oil path Pr. As a result, hydraulic pressure is supplied to an end part (right end in FIG. 3) of the reverse spool 34r in forward-reverse switching valve 34. Thus, the reverse spool 34r moves to the left in opposition to the force applied by the spring 34p. Then, the oil path P1 and the reverse oil path PR, which are disconnected from each other in neutral mode, are connected and hydraulic oil is supplied to the reverse hydraulic clutch 16.

During normal travel, the brake solenoid valve 36 is off because the accelerator pedal 6 is depressed and the accelerator is in the on state. In this state, the oil paths P2 and P3 of the braking hydraulic circuit 22 are disconnected from each other. Thus, braking hydraulic oil is not supplied to the forward-reverse switching valve 34.

Braking

Figure 4:
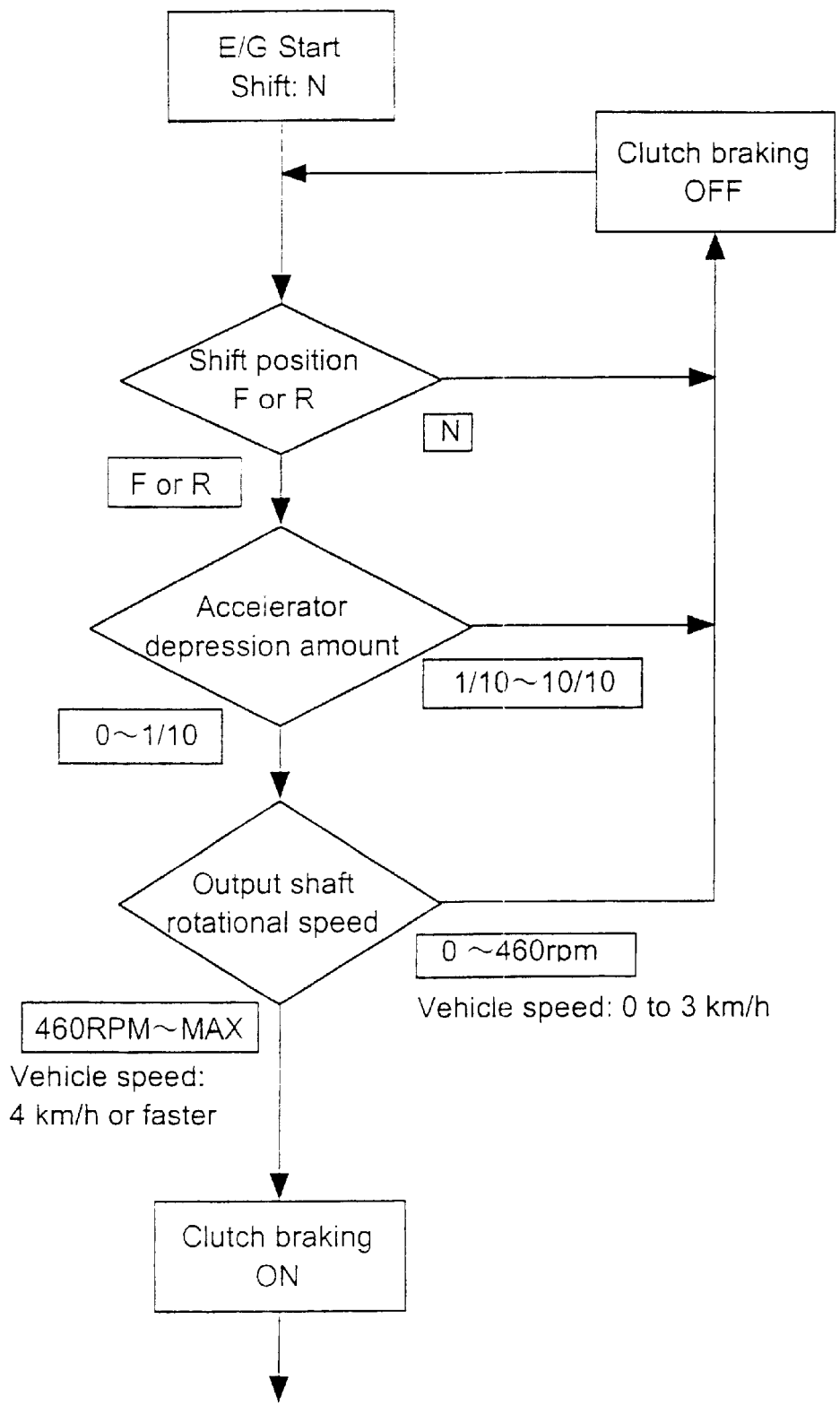
FIG. 4 is a view of a flowchart explaining the operation of the auxiliary braking system.

Next, the operation of the auxiliary braking system during braking is explained with reference to FIG. 3 and the flow chart shown in FIG. 4.

First, when the shift lever 4 is in the neutral position, the detection results are sent to the braking solenoid valve 36 as an electric signal and the braking solenoid valve 36 turns off. Thus, the braking solenoid valve 36 shuts off the connection between the oil path P2 and the oil path P3 of the braking hydraulic circuit 22 and braking hydraulic pressure is not supplied to the clutch. Consequently, clutch braking is not executed.

Meanwhile, when the shift lever 4 is shifted to the forward mode position or the reverse mode position, the braking hydraulic circuit 22 determines whether or not clutch braking is executed based on the accelerator depression amount and the rotational speed of the output shaft 17. In short, clutch braking is executed when the accelerator depression amount is greater than or equal to 0 and less than $1/10$, and the rotational speed of the output shaft 17 is greater than or equal to 460 rpm and less than or equal to the maximum rotational speed (equivalent to a vehicle speed of 4 km/h). More specifically, when the accelerator depression amount is greater than or equal to 0 and less than $1/10$, the braking solenoid valve 36 turns on and the oil path P2 and the oil path P3 are connected. Additionally, when the rotational speed of the output shaft 17 is within the aforementioned range, the centrifugal element 40 of the centrifugal sensor 20 moves outward against the force of the spring 41 and the connection between the oil path P5 and the drain-use oil path P6 is shut off. Therefore, braking hydraulic pressure that has been adjusted by the braking regulator valve 37 is supplied from the braking hydraulic circuit 22 and supplied to the forward-reverse switching valve 34.

Here, when the shift position is the forward mode position, the forward spool 34f moves to the right (as shown FIG. 3) inside the forward-reverse switching valve 34 and connects the oil path P1 and the forward oil path PF. Then, the right end part of the forward spool contacts the left end part of the reverse spool 34r and stops. Needless to say, the reverse spool 34r does not move.

In this state, braking hydraulic oil supplied from the braking hydraulic circuit 22 is supplied through the oil path P3 to a space between the two spools 34f, 34r of the forward-reverse switching valve 34. Braking hydraulic oil is also is supplied to the reverse hydraulic clutch 16 through the reverse hydraulic oil path PR. Therefore, only braking hydraulic pressure is applied to the reverse hydraulic clutch 16 and the reverse hydraulic clutch 16 acts as a brake for forward travel.

When the shift position is the reverse mode position, the operation of the braking hydraulic circuit 22 is the same as just described, except that the operation at the forward-reverse switching valve 34 is exactly the opposite. Thus, during forward travel, the forward hydraulic clutch 15 acts as a brake.

When the accelerator depression amount is greater than or equal to $1/10$ and less than or equal to $10/10$, the braking solenoid valve 36 turns off and the oil paths P2 and P3 are shut off from each other so that clutch braking is not executed. Additionally, when the rotational speed of output shaft 17 is greater than or equal to 0 and less than 460 rpm (equivalent to a vehicle speed of 0 to 3 km/hr), the oil path P5 and the oil path P6 are connected at the centrifugal sensor 20 section and the braking hydraulic oil is drained such that clutch braking is not executed.

Inching Operation

The inching operation is explained.

A spool 33a is provided inside the inching valve 33 and the spool 33a is connected to the brake pedal 5. When the brake pedal 5 is not depressed, the upstream side and downstream side of the inching valve 33 communicate with each other and hydraulic oil is supplied in the normal manner to the forward-reverse switching valve 34.

Meanwhile, when the brake pedal 5 is depressed, the spool 33a moves and hydraulic oil is drained. In short, when the brake pedal 5 is depressed, the hydraulic oil inside the oil path P1 drains, and thus, is not supplied to the forward-reverse switching valve 34. Consequently, the forward hydraulic clutch 15 and the reverse clutch 16 are not connected and power ceases to be transmitted to output shaft 17.

In this embodiment, if the driver releases his or her foot from the accelerator pedal or rests his or her foot on the accelerator pedal in such a manner as to depress barely it, braking is executed by the hydraulic clutch corresponding to the opposite traveling direction. That is, since a similar effect to engine braking is achieved, travel resulting from momentum can be suppressed and the work cycle time can be shortened, thus increasing work efficiency. Furthermore, the service life of the foot brake can be extended because the frequency of its use can be reduced.

In an auxiliary braking system in accordance with the present invention, when the accelerator depression amount goes below a prescribed amount while the vehicle is traveling, the braking clutch engaging means engages the clutch corresponding to the opposite travel direction and brakes the vehicle. Consequently, the load on the main brake is reduced, the life of the main brake is lengthened, and travel resulting from momentum is suppressed such that work efficiency can be improved.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A vehicle auxiliary braking system for use in a vehicle equipped with a transmission having a forward clutch and a reverse clutch comprising:
    a travel detection means being configured to detect vehicle speed to determine whether said vehicle speed is greater than or equal to a prescribed speed;
    an accelerator depression detection means being configured to detect whether a depression amount of a vehicle accelerator pedal is at or below a prescribed depression amount; and
    a braking clutch engaging means being configured to engage the forward or reverse clutch corresponding to an opposite travel direction when detection results from said travel detection means and said accelerator depression detection means indicate that said vehicle is traveling at or above said prescribed speed and said accelerator depression amount is simultaneously at or below said prescribed depression amount.

2. The vehicle auxiliary braking system according to claim 1, wherein
    the forward clutch and the reverse clutch are both hydraulic clutches and said braking clutch engaging means supplies braking hydraulic pressure of a prescribed pressure to the forward clutch and the reverse clutch selectively.

3. The vehicle auxiliary braking system according to claim 2, wherein said accelerator depression detection means detects whether or not said accelerator pedal is being depressed.

4. The vehicle auxiliary braking system according to claim 3, wherein said travel detection means comprises,
    a centrifugal element that is arranged to be acted upon by a centrifugal force when an output shaft of the vehicle rotates, and
    a travel detection hydraulic circuit that is configured to drain hydraulic oil being directed to the forward clutch and the reverse clutch of said braking clutch engaging means by said centrifugal element moving outward due to centrifugal force.

5. The vehicle auxiliary braking system according to claim 4, wherein said braking clutch engaging means also comprises a regulator valve for adjusting braking hydraulic pressure supplied to the forward clutch and the reverse clutch.

6. The vehicle auxiliary braking system according to claim 2, wherein said travel detection means comprises,
    a centrifugal element that is arranged to be acted upon by a centrifugal force when an output shaft of the vehicle rotates, and
    a travel detection hydraulic circuit that is configured to drain hydraulic oil being directed to the forward clutch and the reverse clutch of said braking clutch engaging means by said centrifugal element moving outward due to centrifugal force.

7. The vehicle auxiliary braking system according to claim 6, wherein said braking clutch engaging means also comprises a regulator valve for adjusting braking hydraulic pressure supplied to the forward clutch and the reverse clutch.

8. The vehicle auxiliary braking system according to claim 2, wherein said braking clutch engaging means also comprises a regulator valve for adjusting braking hydraulic pressure supplied to the forward clutch and the reverse clutch.

9. The vehicle auxiliary braking system according to claim 3, wherein said braking clutch engaging means also comprises a regulator valve for adjusting braking hydraulic pressure supplied to the forward clutch and the reverse clutch.

10. An auxiliary braking system for use in a vehicle comprising:
    an engine;
    a power transmission device having a torque converter and power shift transmission, said power shift transmission having a forward hydraulic clutch and a reverse hydraulic clutch;
    a travel detection sensor being configured to detect vehicle speed to determine whether said vehicle speed is greater than or equal to a prescribed speed;
    an accelerator depression detection sensor being configured to detect whether a depression amount of a vehicle accelerator pedal is at or below a prescribed depression amount; and
    a braking clutch engaging sensor being configured to engage said forward or reverse clutch corresponding to an opposite travel direction when detection results from said travel detection sensor and said accelerator depression detection sensor indicate that the vehicle is traveling at or above said prescribed speed and said accelerator depression amount is simultaneously at or below said prescribed depression amount.

11. The vehicle auxiliary braking system according to claim 10, wherein said forward clutch and said reverse clutch are both hydraulic clutches and said braking clutch engaging sensor supplies braking hydraulic pressure of a prescribed pressure to said forward clutch and said reverse clutch selectively.

12. The vehicle auxiliary braking system according to claim 11, wherein said accelerator depression detection sensor detects whether or not said accelerator pedal is being depressed.

13. The vehicle auxiliary braking system according to claim 12, wherein said travel detection sensor comprises,
    a centrifugal element that is arranged to be acted upon by a centrifugal force when an output shaft of the vehicle rotates, and
    a travel detection hydraulic circuit that is configured to drain hydraulic oil being directed to said forward clutch and said reverse clutch of said braking clutch engaging sensor by said centrifugal element moving outward due to centrifugal force.

14. The vehicle auxiliary braking system according to claim 13, wherein said braking clutch engaging sensor also comprises a regulator valve configured to adjust braking hydraulic pressure supplied to said forward clutch and said reverse clutch.

15. A forklift comprising:
- a main body;
- a fork unit;
- a steering wheel;
- a shift lever configured to facilitate directional selection of the forklift;
- a brake pedal;
- an accelerator pedal; and
- an auxiliary braking system, said braking system having,
  - an engine,
  - a power transmission device having a torque converter and power shift transmission, said power shift transmission having a forward hydraulic clutch and a reverse hydraulic clutch,
  - a travel detection sensor being configured to detect forklift speed to determine whether said speed is greater than or equal to a prescribed speed,
  - an accelerator depression detection sensor being configured to detect whether a depression amount of said accelerator pedal is at or below a prescribed depression amount, and
  - a braking clutch engaging sensor being configured to engage said forward or reverse clutch corresponding to an opposite travel direction when detection results from said travel detection sensor and said accelerator depression detection sensor indicate that said forklift is traveling at or above said prescribed speed and said accelerator depression amount is simultaneously at or below said prescribed depression amount.

16. The forklift according to claim 15, wherein said forward clutch and said reverse clutch are both hydraulic clutches and said braking clutch engaging sensor supplies braking hydraulic pressure of a prescribed pressure to said forward clutch and said reverse clutch selectively.

17. The forklift according to claim 16, wherein said accelerator depression detection sensor detects whether or not said accelerator pedal is being depressed.

18. The forklift according to claim 17, wherein said travel detection sensor comprises,
- a centrifugal element that is arranged to be acted upon by a centrifugal force when an output shaft of the forklift rotates, and
- a travel detection hydraulic circuit that is configured to drain hydraulic oil being directed to said forward clutch and said reverse clutch of said braking clutch engaging sensor by said centrifugal element moving outward due to centrifugal force.

19. The forklift according to claim 18, wherein said braking clutch engaging sensor also comprises a regulator valve configured to adjust braking hydraulic pressure supplied to said forward clutch and said reverse clutch.

* * * * *